United States Patent [19]
Hagan et al.

[11] Patent Number: 5,988,473
[45] Date of Patent: Nov. 23, 1999

[54] TRUCK STORAGE BOX APPARATUS

[76] Inventors: Sonya L. Hagan; Samuel D. Hagan, both of 2055 Hwy 19, Mars Hill, N.C. 28754

[21] Appl. No.: 09/136,657

[22] Filed: Aug. 19, 1998

Related U.S. Application Data

[60] Provisional application No. 60/056,574, Aug. 27, 1998.

[51] Int. Cl.⁶ ..................................................... B60R 7/00
[52] U.S. Cl. .......................... 224/404; 296/37.6; 312/216; 312/324; 312/328
[58] Field of Search .................................... 224/404, 498, 224/542; 220/503, 524, 345.2, 345.4, 345.5; 312/216, 324, 328, 290; 296/37.6

[56] References Cited

U.S. PATENT DOCUMENTS

| | | | |
|---|---|---|---|
| 2,967,080 | 1/1961 | Nelson | 312/216 |
| 2,987,358 | 6/1961 | Roberts | 312/216 |
| 4,844,305 | 7/1989 | McKneely | 224/404 |
| 4,967,944 | 11/1990 | Waters | 224/404 |
| 5,419,476 | 5/1995 | White | 224/273 |
| 5,667,115 | 9/1997 | Verhaeg | 224/275 |

*Primary Examiner*—Gregory M. Vidovich
*Assistant Examiner*—Maerena W. Brevard

[57] ABSTRACT

A storage box apparatus includes a base member which includes a lock loop. First and second storage compartment assemblies are supported by the base member and include first and second compartment regions. Sliding trays are positioned over the compartment regions. Hinged covers cover the sliding trays. Lock bars extend downward from distal edges of hinged covers which prevent the sliding trays from sliding outward when the hinged covers are closed. A third storage compartment assembly is supported by the base member and is located between the first and second storage compartment assemblies along a longitudinal axis. The third storage compartment assembly includes a plurality of drawers arrayed along a vertical axis, wherein each of the drawers includes a drawer handle. Each of the drawer handles is in linear alignment with the other drawer handles and the lock loop. One of the drawers, such as the bottommost drawer, includes internal divider walls for dividing an interior space in the one of the drawers into a plurality of smaller storage spaces. A locking pin is threaded through the drawer handles and the lock loop and is used for locking the drawers in a closed position. A padlock is provided for locking the locking pin into locking position with respect to the drawer handles. A first key lock assembly is connected to the first hinged cover, and a second key lock assembly is connected to the second hinged cover.

7 Claims, 3 Drawing Sheets

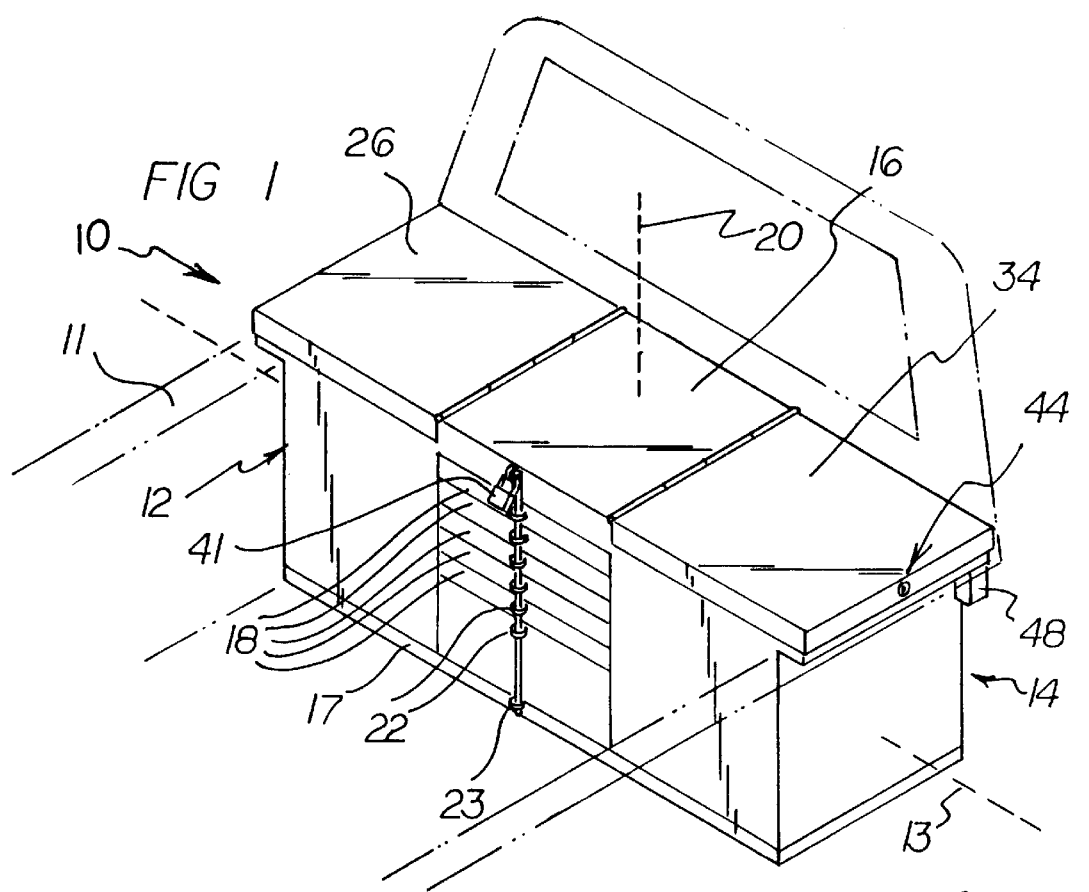
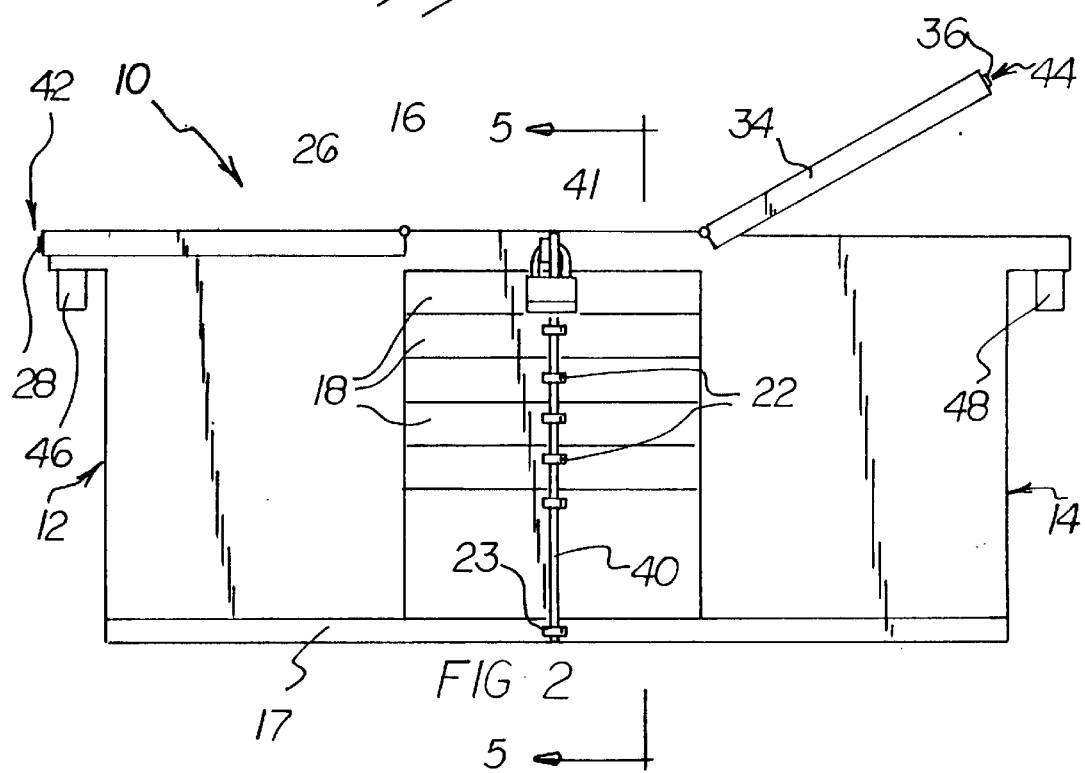

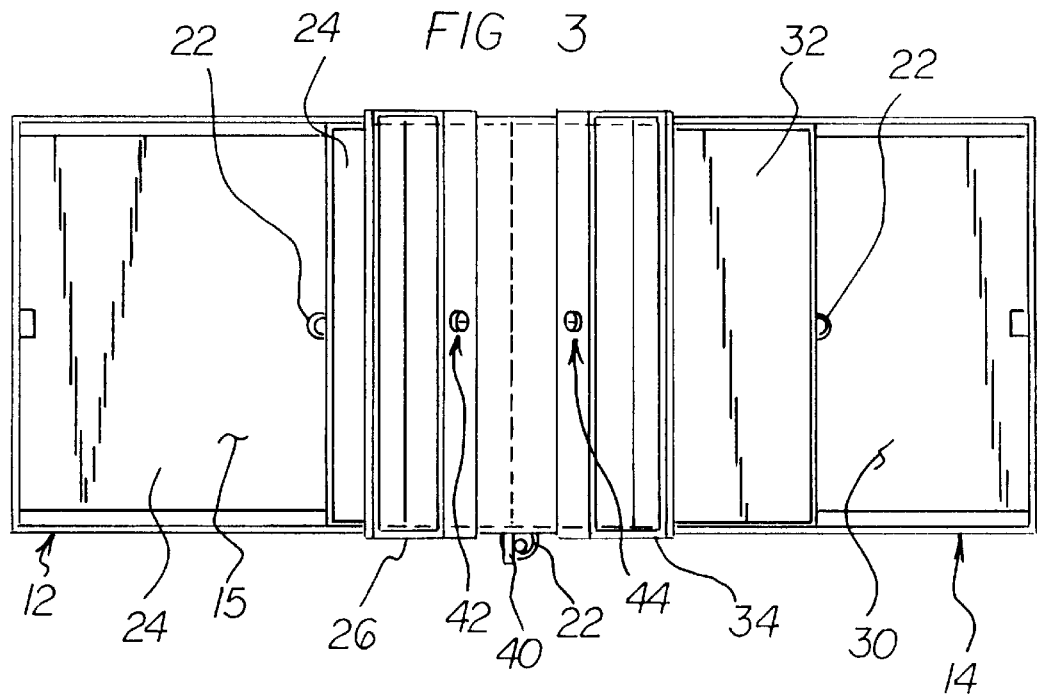
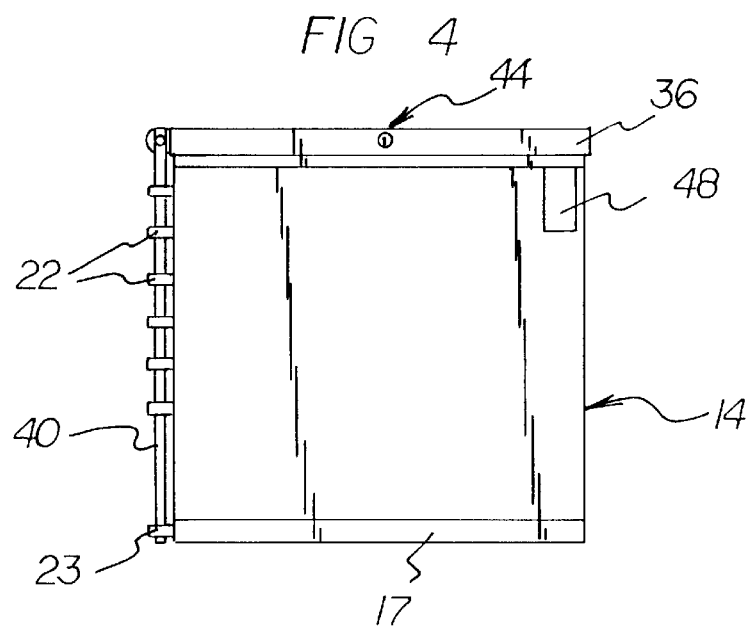

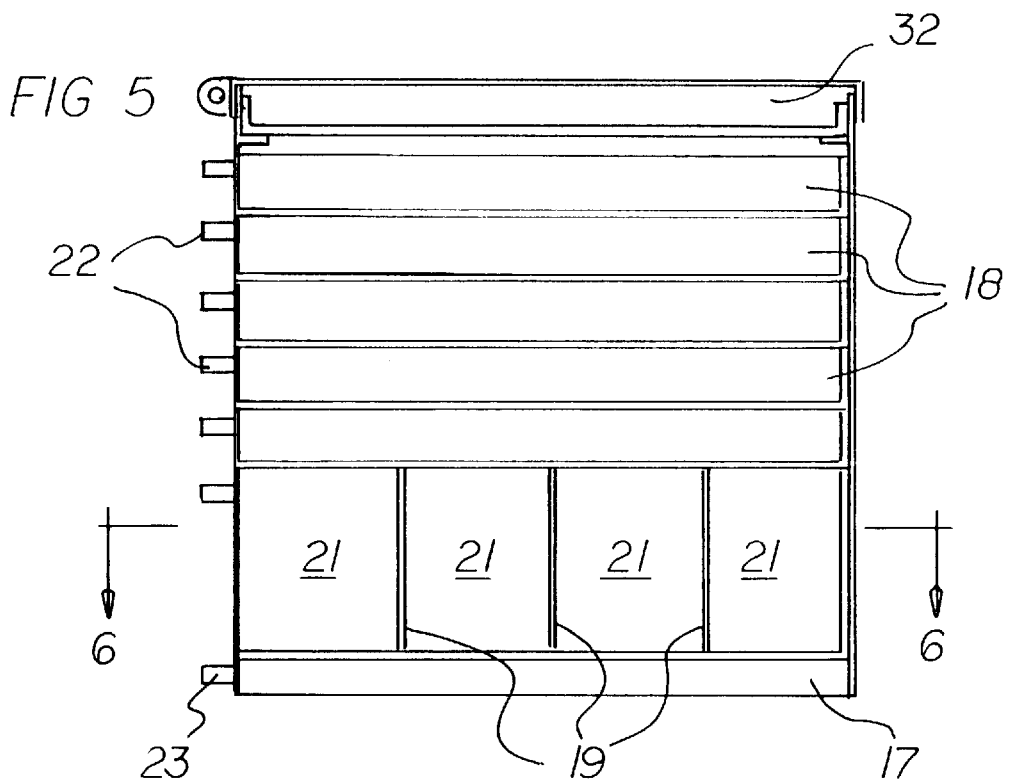
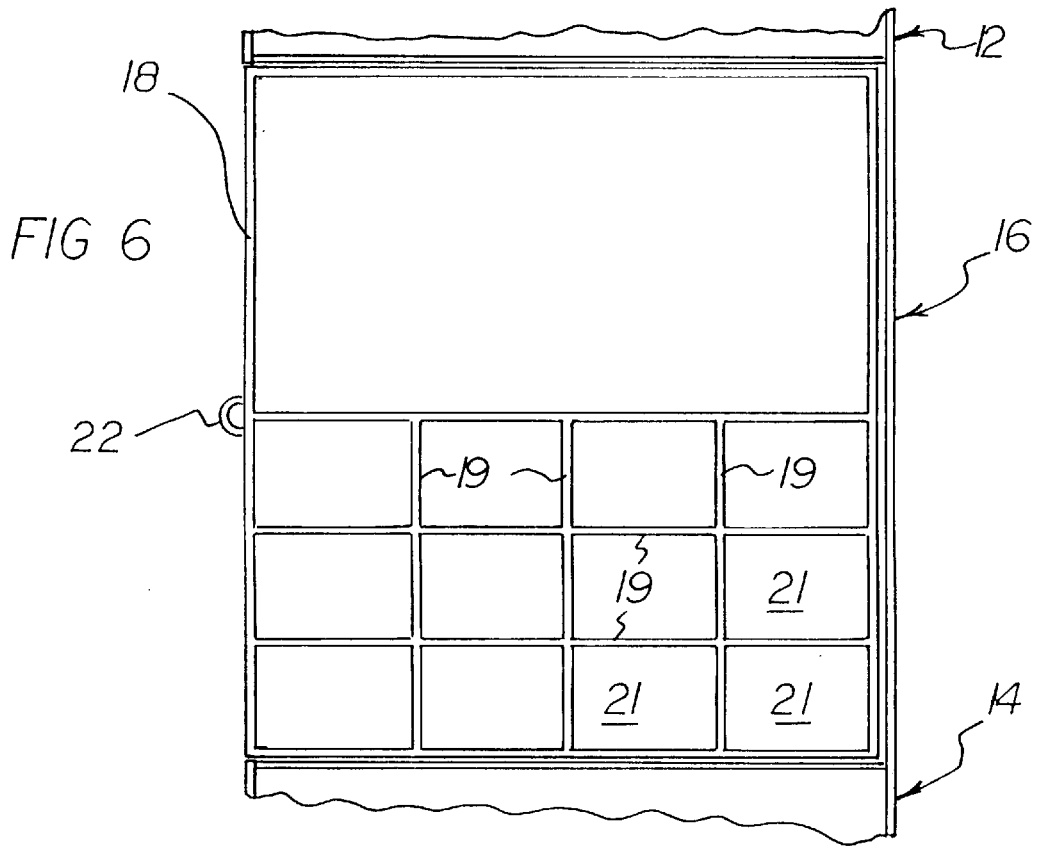

TRUCK STORAGE BOX APPARATUS

CROSS-REFERENCE TO RELATED APPLICATION

This application claims priority based upon my prior copending Provisional Application Ser. No. 60/056,574, filed Aug. 27, 1998.

BACKGROUND OF THE INVENTION

1. Field of the Invention

The present invention relates generally to storage boxes and, more particularly, to storage boxes especially adapted for being carried on the bed of a pickup truck.

2. Description of the Prior Art

It is well known for storage boxes to be carried on beds of pickup trucks. In this respect, there are a number of features that would be desirable in such storage boxes. For example, for stability of a storage box, it would be desirable if the storage box had special features for engaging the walls adjacent to the pickup truck bed. For purposes of convenience, it would be desirable if a storage box for a pickup truck had trays which slide outwards over and past the sides of the walls of the pickup truck bed. It would also be desirable if a storage box for a pickup truck had sliding drawers which slide backwards towards the rear of the pickup truck over a portion of the pickup truck bed.

When a person uses a storage box for a pickup truck, the person often wants to store a number of both relatively large and relatively small articles. In this respect, it would be desirable if a storage box for a pickup truck had storage compartments for both relatively large and relatively small articles.

Articles that are stored in a pickup truck storage box are often very expensive and difficult to replace. With this in mind, it is important that such items in the storage box are secured from theft. In this respect, it would be desirable if a storage box for a pickup truck had suitable locking devices for securing articles retained in the storage box and for preventing theft thereof.

Thus, it would be desirable if a storage box for a pickup truck has the following combination of desirable features: (1) engages the walls adjacent to the pickup truck bed; (2) has trays which slide outwards over and past the sides of the walls of the pickup truck bed; (3) has sliding drawers which slide backwards towards the rear of the pickup truck over a portion of the pickup truck bed; (4) has storage compartments for both relatively large and relatively small articles; and (5) has suitable locking devices for securing articles retained in the storage box and for preventing theft thereof The foregoing desired characteristics are provided by the unique truck storage box apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a storage box apparatus which includes a base member which includes a lock loop. A first storage compartment assembly is supported by the base member and includes a first compartment region. A first sliding tray is positioned over the first compartment region. A first hinged cover covers the first sliding tray, and a first lock bar, extending downward from a distal edge of the first hinged cover, prevents the first sliding tray from sliding outward when the first hinged cover is closed. A second storage compartment assembly is supported by the base member and includes a second compartment region. A second sliding tray is positioned over the second compartment region. A second hinged cover for covers the second sliding tray, and a second lock bar, extending downward from a distal edge of the second hinged cover, prevents the second sliding tray from sliding outward when the second hinged cover is closed. A third storage compartment assembly is supported by the base member and is located between the first storage compartment assembly and the second storage compartment assembly along a longitudinal axis. The third storage compartment assembly includes a plurality of drawers arrayed along a vertical axis, wherein each of the drawers includes a drawer handle. Each of the drawer handles is in linear alignment with the other drawer handles and the lock loop.

The first storage compartment assembly and the second storage compartment assembly can be used for storing relatively large items. The drawers in the third storage compartment assembly can be used for storing a variety of relatively small items such as screws, wrenches, sockets, and hand tools. One of the drawers, such as the bottommost drawer, includes internal divider walls for dividing an interior space in the one of the drawers into a plurality of smaller storage spaces. The smaller storage spaces can be used for storing various sizes of nuts, bolts, and screws in an organized fashion.

A locking pin is threaded through the drawer handles and the lock loop and is used for locking the drawers in a closed position. A padlock is provided for locking the locking pin into locking position with respect to the drawer handles. A first key lock assembly is connected to the first hinged cover, and a second key lock assembly is connected to the second hinged cover.

A first pickup truck connector is connected to the first storage compartment assembly for fitting into a reception channel in a side wall of a pickup truck, and a second pickup truck connector is connected to the second storage compartment assembly for fitting into a reception channel in a side wall of a pickup truck.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved truck storage box apparatus which has all of the advantages of the prior art and none of the disadvantages.

It is another object of the present invention to provide a new and improved truck storage box apparatus which may be easily and efficiently manufactured and marketed.

It is a further object of the present invention to provide a new and improved truck storage box apparatus which is of durable and reliable construction.

An even further object of the present invention is to provide a new and improved truck storage box apparatus which is susceptible of a low cost of manufacture with regard to both materials and labor, and which accordingly is then susceptible of low prices of sale to the consuming public, thereby making such truck storage box apparatus available to the buying public.

Still yet a further object of the present invention is to provide a new and improved truck storage box apparatus which engages the walls adjacent to the pickup truck bed.

Still another object of the present invention is to provide a new and improved truck storage box apparatus that has trays which slide outwards over and past the sides of the walls of the pickup truck bed.

Yet another object of the present invention is to provide a new and improved truck storage box apparatus which has sliding drawers which slide backwards towards the rear of the pickup truck over a portion of the pickup truck bed.

Even another object of the present invention is to provide a new and improved truck storage box apparatus that has storage compartments for both relatively large and relatively small articles.

Still a further object of the present invention is to provide a new and improved truck storage box apparatus which has suitable locking devices for securing articles retained in the storage box and for preventing theft thereof.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the truck storage box apparatus of the invention in use in a pickup truck.

FIG. 2 is an enlarged front view of the embodiment of the truck storage box apparatus shown in FIG. 1, removed from the pickup truck and with one end cover in a lifted position.

FIG. 3 is a top view of the embodiment of the truck storage box apparatus of FIG. 2 with both end covers in respective lifted positions.

FIG. 4 is a side view of the embodiment of the invention shown in FIG. 1.

FIG. 5 is an enlarged cross-sectional view of the embodiment of the invention shown in FIG. 2 taken along line 5—5 thereof.

FIG. 6 is an enlarged cross-sectional view of the embodiment of the invention shown in FIG. 5 taken along line 6—6 thereof.

DESCRIPTION OF THE PREFERRED EMBODIMENT

With reference to the drawings, a new and improved truck storage box apparatus embodying the principles and concepts of the present invention will be described.

Turning to FIGS. 1–6, there is shown an exemplary embodiment of the truck storage box apparatus of the invention generally designated by reference numeral 10. In its preferred form, truck storage box apparatus 10 includes a base member 17 which includes a lock loop 23. A first storage compartment assembly 12 is supported by the base member 17 and includes a first compartment region 15. A first sliding tray 24 is positioned over the first compartment region 15. A first hinged cover 26 covers the first sliding tray 24, and a first lock bar 28, extending downward from a distal edge of the first hinged cover 26, prevents the first sliding tray 24 from sliding outward when the first hinged cover 26 is closed. A second storage compartment assembly 14 is supported by the base member 17 and includes a second compartment region 30. A second sliding tray 32 is positioned over the second compartment region 30. A second hinged cover 34 covers the second sliding tray 32, and a second lock bar 36, extending downward from a distal edge of the second hinged cover 34, prevents the second sliding tray 32 from sliding outward when the second hinged cover 34 is closed. A third storage compartment assembly 16 is supported by the base member 17 and is located between the first storage compartment assembly 12 and the second storage compartment assembly 14 along a longitudinal axis 13. The third storage compartment assembly 16 includes a plurality of drawers 18 arrayed along a vertical axis 20, wherein each of the drawers 18 includes a drawer handle 22. Each of the drawer handles 22 is in linear alignment with the other drawer handles 22 and the lock loop 23.

As shown in FIGS. 3 and 5, each of trays 24 and 32 is supported for sliding movement over a pair of spaced, parallel L-shaped flanges or rails which extend parallel to axis 13 across the top of truck storage apparatus 10 (FIG. 5). Sliding movement outward of each tray along the rails is prevented by each locking bar on the distal edge of each hinged cover, respectively. This is depicted, by way of example in FIG. 4, where the locking bar 36 is clearly shown to block tray 32 from sliding outward along the L-shaped rails illustrated in FIG. 5, when the hinged cover is in the down position. As will occur to those of ordinary skill, a suitable opening may be provided in the sidewall of the upper portion of the apparatus to provide for such outward movement. In FIG. 3, the trays 24 and 32 are shown partially slid backward along the L-shaped rails over the top of the third storage compartment assembly 16 to illustrate the storage compartments 15 and 30 underneath the trays and over which the trays may slide.

The first storage compartment assembly 12 and the second storage compartment assembly 14 can be used for storing relatively large items. The drawers 18 in the third storage compartment assembly 16 can be used for storing a variety of relatively small items such as screws, wrenches, sockets, and hand tools. One of the drawers 18, such as the bottommost drawer, includes internal divider walls 19 for dividing an interior space in the one of the drawers 18 into a plurality of smaller storage spaces 21. The smaller storage spaces 21 can be used for storing various sizes of nuts, bolts, and screws in an organized fashion.

A locking pin 40 is threaded through the drawer handles 22 and the lock loop 23 and is used for locking the drawers 18 in a closed position. A padlock 41 is provided for locking the locking pin 40 into locking position with respect to the drawer handles 22. A first key lock assembly 42 is connected to the first hinged cover 26, and a second key lock assembly 44 is connected to the second hinged cover 34.

A first pickup truck connector 46 is connected to the first storage compartment assembly 12 for fitting into a reception channel in a side wall of a pickup truck 11, and a second pickup truck connector 48 is connected to the second storage compartment assembly 14 for fitting into a reception channel in a side wall of a pickup truck 11.

To install the storage box apparatus 10 of the invention on the bed of a pickup truck 11, the storage box apparatus 10 is lowered into the bed of the pickup truck 11 so that the first pickup truck connector 46 and the second pickup truck connector 48 are received in respective reception channels in the side walls of the pickup truck 11. Once the storage box apparatus 10 is installed in the pickup truck 11, first hinged cover 26 can be lifted, the first sliding tray 24 can be pulled out, and the first compartment region 15 can be accessed. Similarly, the second hinged cover 34 can be lifted, the second sliding tray 32 can be pulled out, and the second compartment region 30 can be accessed. The drawers 18 in the third storage compartment assembly 16 can also be accessed.

When is it desired to lock up the storage box apparatus 10 of the invention, the drawers 18 are slid into the third storage compartment assembly 16. The locking pin 40 is threaded through the drawer handles 22 and the lock loop 23, and the padlock 41 is installed, as shown in FIG. 1. In addition, the first sliding tray 24 and the second sliding tray 32 are slid in. The first hinged cover 26 and the second hinged cover 34 are lowered, and the first key lock assembly 42 and the second key lock assembly 44 are locked.

To access the storage box apparatus 10 again, the various locks are unlocked, and the locking pin 40 is removed.

The components of the truck storage box apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved truck storage box apparatus that is low in cost, relatively simple in design and operation, and which may advantageously be used to engage the walls adjacent to the pickup truck bed. With the invention, a truck storage box apparatus is provided which has trays which slide outwards over and past the sides of the walls of the pickup truck bed. With the invention, a truck storage box apparatus is provided which has sliding drawers which slide backwards towards the rear of the pickup truck over a portion of the pickup truck bed. With the invention, a truck storage box apparatus is provided which has storage compartments for both relatively large and relatively small articles. With the invention, a truck storage box apparatus is provided which has suitable locking devices for securing articles retained in the storage box and for preventing theft thereof.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A storage box apparatus, comprising:

a base member which includes a lock loop, a first storage compartment assembly supported by said base member, wherein said first storage compartment assembly includes a first compartment region, a first sliding tray positioned over said first compartment region, a first hinged cover for covering said first sliding tray, and a first lock bar, extending downward from a distal edge of said first hinged cover, for preventing said first sliding tray from sliding outward when said first hinged cover is closed, a second storage compartment assembly supported by said base member, wherein said second storage compartment assembly includes a second compartment region, a second sliding tray positioned over said second compartment region, a second hinged cover for covering said second sliding tray, and a second lock bar, extending downward from a distal edge of said second hinged cover, for preventing said second sliding tray from sliding outward when said second hinged cover is closed, and a third storage compartment assembly supported by said base member and located between said first storage compartment assembly and said second storage compartment assembly along a longitudinal axis, wherein said third storage compartment assembly includes a plurality of drawers arrayed along a vertical axis, wherein each of said drawers includes a drawer handle, wherein each of said drawer handles is in linear alignment with said other drawer handles and said lock loop.

2. The apparatus of claim 1 wherein one of said drawers includes internal divider walls for dividing an interior space in said one of said drawers into a plurality of smaller storage spaces.

3. The apparatus of claim 2 wherein said smaller storage spaces can be used for storing various sizes of nuts, bolts, and screws in an organized fashion.

4. The apparatus of claim 1, further including:

a locking pin, threaded through said drawer handles and said lock loop for locking said drawers in a closed position.

5. The apparatus of claim 4, further including:

a padlock for locking said locking pin into locking position with respect to said drawer handles.

6. The apparatus of claim 1, further including:

a first key lock assembly connected to said first hinged cover, and a second key lock assembly connected to said second hinged cover.

7. The apparatus of claim 1, further including:

a first pickup truck connector connected to said first storage compartment assembly for fitting into a reception channel in a side wall of a pickup truck, and a second pickup truck connector connected to said second storage compartment assembly for fitting into a reception channel in a side wall of a pickup truck.

* * * * *